United States Patent [19]

Gaden et al.

[11] Patent Number: 4,532,578
[45] Date of Patent: Jul. 30, 1985

[54] VEHICLE BODY LAMP MOUNTING ARRANGEMENT

[75] Inventors: David W. Gaden, Rochester; Ted C. Habas, Sterling Heights, both of Mich.

[73] Assignee: General Motors Corporation, Detroit, Mich.

[21] Appl. No.: 577,603

[22] Filed: Feb. 6, 1984

[51] Int. Cl.³ ............................................. B60Q 1/26
[52] U.S. Cl. ..................................... 362/83; 362/80; 362/365; 362/368
[58] Field of Search ................. 362/83, 80, 362, 365, 362/368, 249

[56] References Cited

U.S. PATENT DOCUMENTS

| | | | |
|---|---|---|---|
| 2,403,904 | 7/1946 | Blomberg | 248/292 |
| 2,606,772 | 8/1952 | Mead et al. | 280/152 |
| 2,812,955 | 11/1957 | Urban et al. | 280/152 |
| 3,109,159 | 10/1963 | Jordan et al. | 340/67 |
| 4,251,103 | 2/1981 | Nakajima et al. | 362/83 |
| 4,364,101 | 12/1982 | Brockmeyer | 362/80 |
| 4,420,797 | 12/1983 | Tohata | 362/80 |
| 4,423,475 | 12/1983 | Bartl | 362/80 |
| 4,471,411 | 9/1984 | Graham et al. | 362/80 |
| 4,475,148 | 10/1984 | Tomforde | 362/83 |
| 4,488,206 | 12/1984 | Mizusawa | 362/83 |

Primary Examiner—Ira S. Lazarus
Attorney, Agent, or Firm—Herbert Furman

[57] ABSTRACT

A vehicle body lamp mounting arrangement wherein a vehicle body lamp assembly includes linear retention flanges on its upper and lower walls which engage behind and in face to face relationship with linear retention flanges of a body lamp opening to releasably retain the lamp assembly within the opening against movement outboard thereof.

3 Claims, 8 Drawing Figures

VEHICLE BODY LAMP MOUNTING ARRANGEMENT

This invention relates generally to a vehicle body lamp mounting arrangement and more particularly to the mounting of a vehicle body taillamp assembly within a vehicle body taillamp opening.

Various prior art arrangements are known to mount vehicle body taillamp assemblies within vehicle body taillamp openings such as by screws inserted either from the interior or the exterior of the body; hinges; or other fittings or fasteners.

The mounting arrangement of this invention differs from such prior art arrangements in that the taillamp assembly includes linear retention flanges which are located transversely of the body and slidably mate with like respective flanges on the walls of the taillamp opening to releasably retain the assembly within the opening. In the preferred embodiment of the invention, a vehicle body rear finishing panel includes a taillamp opening having a rear open wall defined by generally juxtaposed upper and lower walls, the inboard ends of which are joined by an inboard side wall. The outboard side wall of the opening is also open and is defined by the upper and lower walls. The upper and lower walls are also joined by an outboard forward wall. The upper and lower walls are each provided with a pair of laterally extending linear retention flanges along their forward edges. The flanges face the rear open wall of the opening and each includes a lead-in flange at its outboard terminus which extends angularly thereto. Each wall of the opening is provided with at least one such retention flange and lead-in flange, although a pair is preferred. The taillamp assembly includes a reflector housing having upper and lower walls of generally L-shape, an inboard wall, and a forward wall, such walls being juxtaposed and complementary to like walls of the taillamp opening. The reflector housing is closed by a lens which also provides the rear wall of the assembly. The upper and lower walls of the taillamp assembly are each provided with a pair of linear retention flanges, each being complementary and respective to a like flange of the taillamp opening. Each linear retention flange includes a lead-in flange which extends angularly thereto at its inboard terminus and is complementary and respective to a lead-in flange of the taillamp opening. The taillamp assembly further includes a pair of slotted ears forwardly of the upper wall thereof.

The taillamp assembly is inserted through the open rear and outer walls of the taillamp opening and the linear retention flanges thereof are located outboard of respective retention flanges of the taillamp opening. The taillamp assembly is then moved inboard of the opening. During such movement, the lead-in flanges of the taillamp assembly engage respective lead-in flanges of the opening and cam the retention flanges of the taillamp assembly forwardly of and behind respective flanges of the opening and in face to face engagement therewith. The engaged retention flanges releasably locate the taillamp assembly within the opening against movement rearwardly and outwardly thereof. One of the slotted ears of the taillamp assembly is located inboard of the inboard lead-in flange and the other is located outboard of the outboard retention flange so as to be able to respectively fit inboard and outboard of the flanges of the taillamp opening when the taillamp assembly is inserted into the taillamp opening and to move with the taillamp asssembly inboard of the opening without interference. Fasteners join the slotted ears of the taillamp assembly to the finishing panel to releasably retain the taillamp assembly within the opening. An additional interfitting snap fastener arrangement may be provided between the forward wall of the taillamp assembly and the forward wall of the taillamp opening. Thus, the mounting arrangement of this invention provides for ease of mounting of the taillamp assembly on the vehicle body during the body assembly process and also provides for ease of removal should it be necessary for repair or replacement purposes.

The primary feature of this invention is that it provides an improved taillamp mounting arrangement for vehicle bodies wherein juxtaposed complementary walls of a taillamp assembly and of a taillamp opening in a body finishing panel are each provided with respective linear flanges which engage in face to face relationship to releasably retain the taillamp assembly within the opening against movement rearwardly thereof. Another feature is that the retention flanges have lead-in angular flanges which aid in camming the linear flanges into engaged face to face relationship during inboard movement of the taillamp assembly within the opening. A further feature is that fasteners releasably retain the taillamp assembly within the opening against movement outboard of the opening.

These and other features of the invention will be readily apparent from the following specification and drawings wherein.

Figure 1:
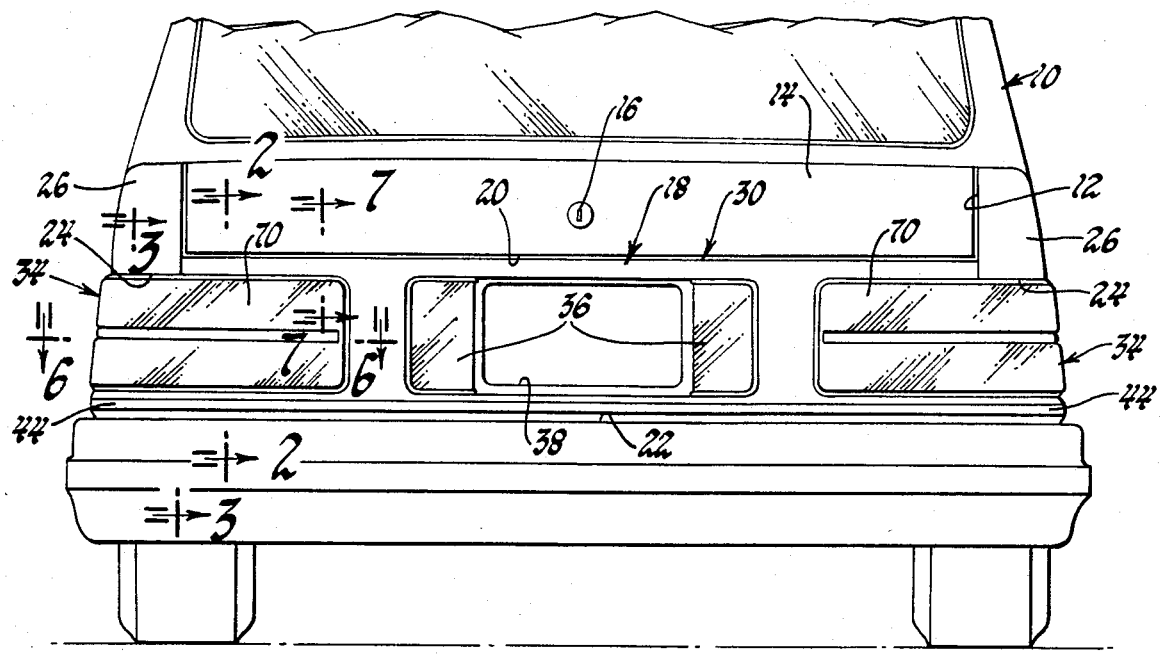
FIG. 1 is a rear elevational view of a vehicle body embodying a lamp mounting arrangement according to this invention.
Figure 2:
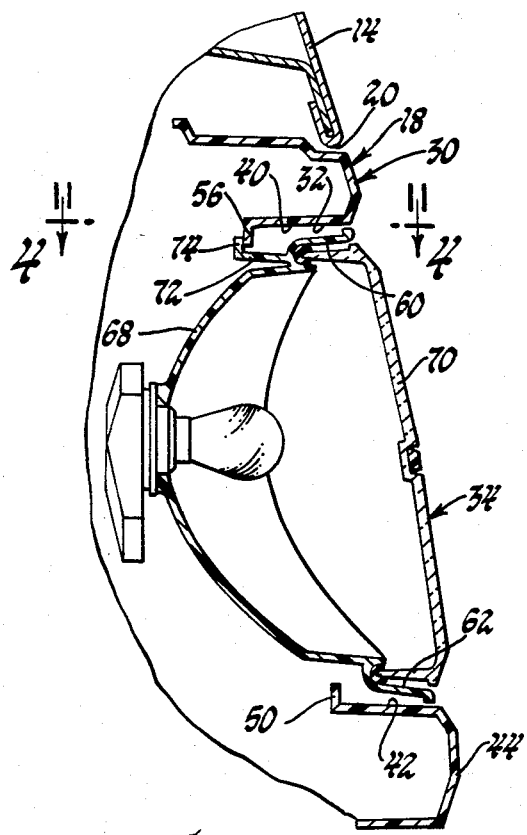
FIG. 2 is an enlarged sectional view taken along line 2—2 of FIG. 1.
Figure 3:
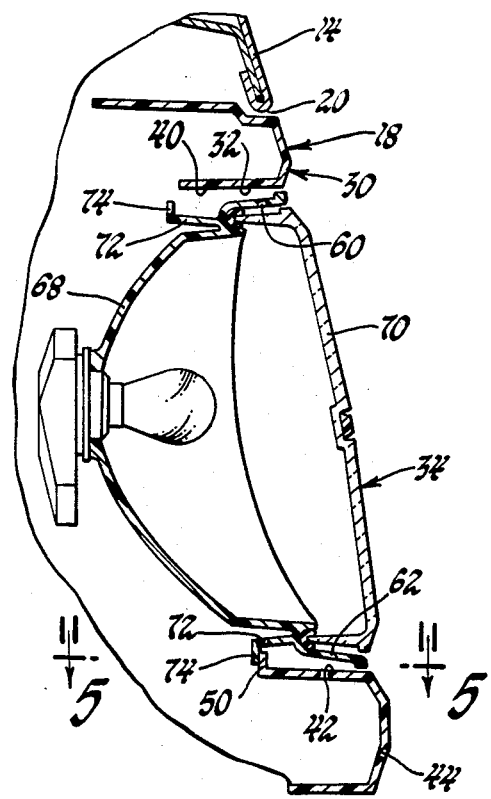
FIG. 3 is an enlarged sectional view taken along line 3—3 of FIG. 1.

Referring now particularly to FIG. 1 of the drawings, a vehicle body 10 includes a rear trunk or deck lid opening 12 which is opened and closed by a decklid 14. The decklid 14 is conventionally hinged to the body adjacent its forward edge and releasably retained to the body adjacent its rearward edge through a conventional decklid latch which may be released through an outside key cylinder 16. A taillamp structure 18 fits within a transverse slot or elongated body opening 20, the lower edge of which is defined by a vehicle rear bumper 22, and the upper edge of which is defined by the rearward edge of the decklid 14 and the rearward edges 24 of the body rear fenders or rear quarter panels 26. The forward wall of the opening 20 is conventionally provided by a rear end panel of the body, not shown, which extends transversely of the body and joins the quarter panels 26 and the rear floor pan, not shown. Body structure such as this is conventional in a number of current and past production vehicle bodies.

The taillamp structure 18 includes a one piece molded finishing panel 30 of plastic material having like right hand and left hand taillamp openings 32 which mount like opposite hand taillamp assemblies 34. The panel 30 also mounts backup lamp assemblies 36 which are located to either side of a center opening 38 which may be closed by a fixed license plate or by a hinged license plate if the vehicle has a rear fuel inlet.

The left hand opening 32, as best shown in FIGS. 2, 3, 7 and 8, is defined by an upper wall 40 which is generally planar and formed as the lower leg of a generally U-shape cross-section upper rail of the panel 30. Wall 40 is juxtaposed to a generally L-shaped planar lower wall 42 which is part of a U-shape cross-section lower rail 44 of the panel 30. The walls 40 and 42 are interconnected by an inboard side wall 46 and an outboard forward wall 48. Preferably the entire panel 30 is molded of plastic material of either one piece or multiple piece construction. As can be seen, the wall 42 is of generally L-shape while the wall 40 is of partial L-shape. An integral interrupted lateral flange 50 extends laterally to the walls 40, 42, 46 and 48. Portions of flange 50 provide a pair of generally linear retention flanges 52 along the forward edge of wall 42. Each such retention flange 52 includes an integral angular lead-in flange 54 at its outboard terminus. Other portions of flange 50 provide a pair of generally linear retention flanges 56 along the forward edge of wall 40. Each flange 56 includes an integral angular lead-in flange 58 at its outboard terminus.

Figure 4:
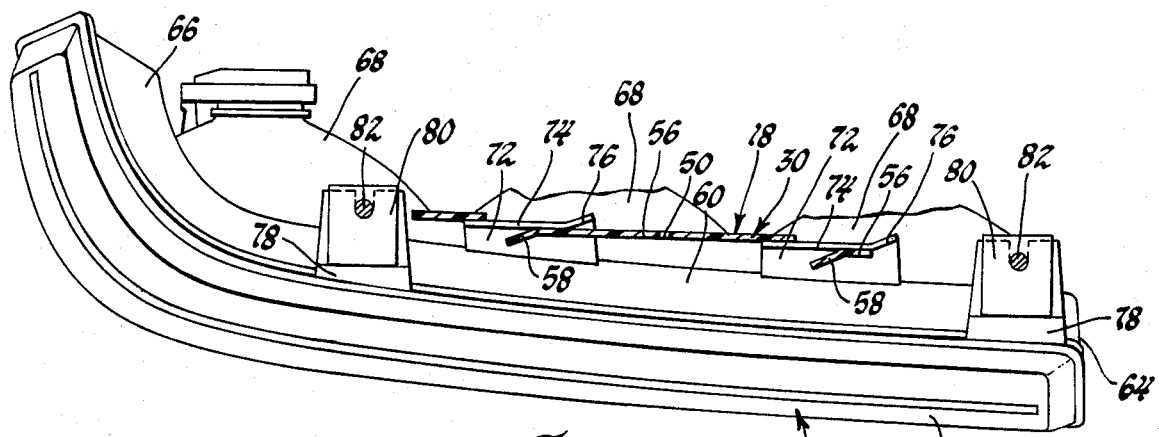
FIG. 4 is a view taken along line 4—4 of FIG. 2.
Figure 5:
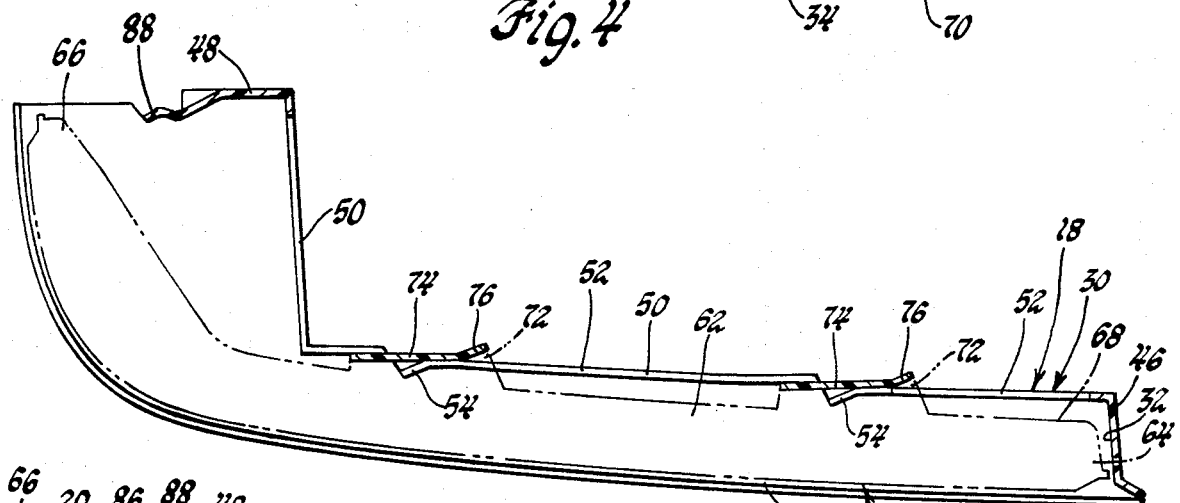
FIG. 5 is a view taken along line 5—5 of FIG. 2.
Figure 8:
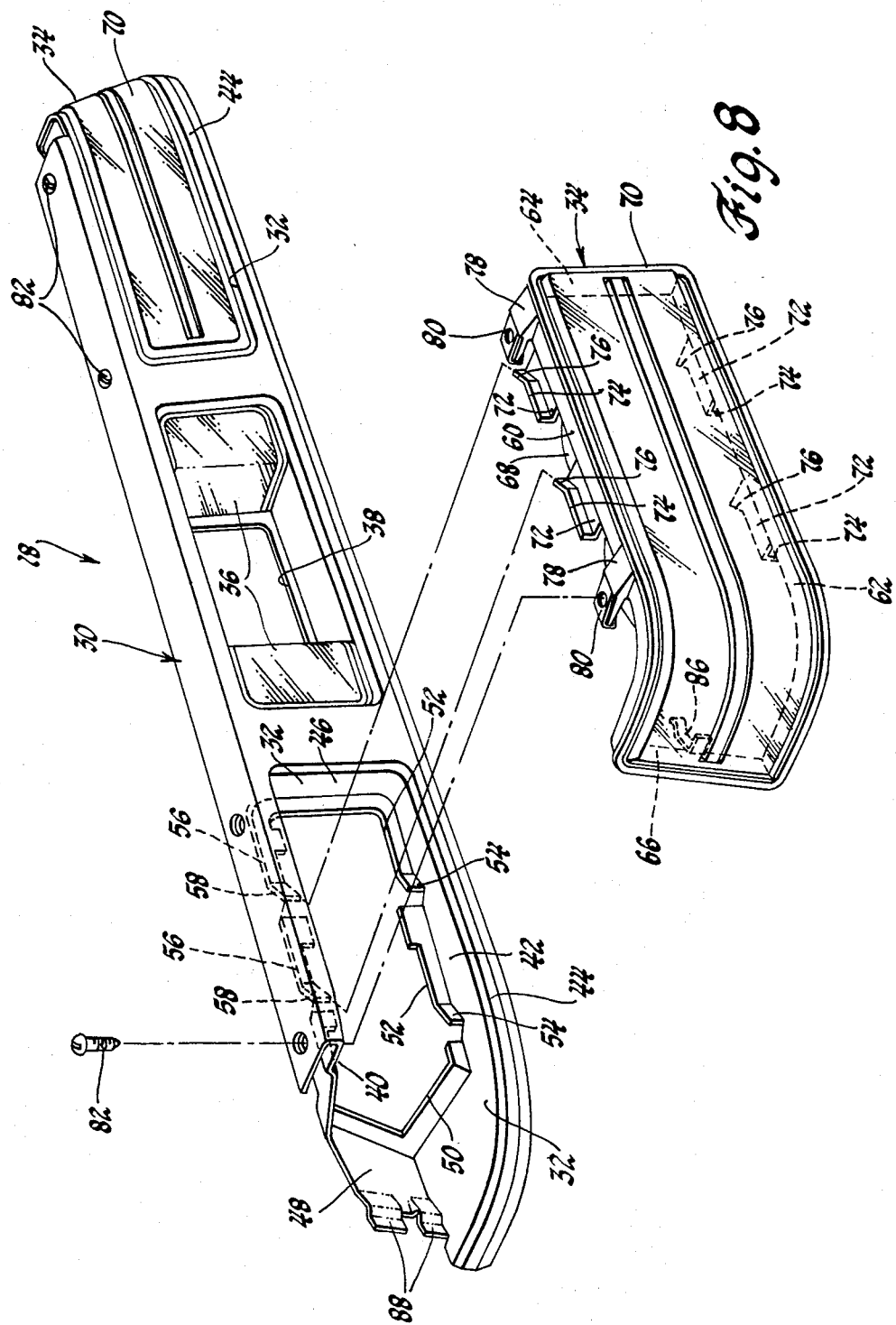
FIG. 8 is an exploded perspective view.

The taillamp assembly 34 is of generally L-shape and includes a reflector housing having upper and lower L-shape walls 60 and 62, an inboard side wall 64, an outboard side wall 66, and a forward wall 68. The housing is closed by a lens 70 which fits within the walls 60, 62, 64 and 66 and is conventionally secured thereto. As best shown in FIGS. 4, 5 and 8, the longer leg portions of the walls 60 and 62 each include a pair of integral flanges 72, each of which terminates in a lateral linear retention flange 74 having an angular lead-in flange 76 at its inboard terminus. Also molded integral with wall 60 is a pair of slotted cantilever brackets 78, each of which mounts a spring clip type slotted nut 80.

As best shown in FIGS. 4 and 5 of the drawings, each of the upper flanges 74 is respective to one of the flanges 56 and each of the lower flanges 74 is respective to one of the flanges 52. The respective pairs of flanges 74, 56 and 74, 52 engage in face to face relationship and retain the lamp assembly 34 within the opening 32 against removal rearwardly of the opening and of the body 10.

Figure 7:
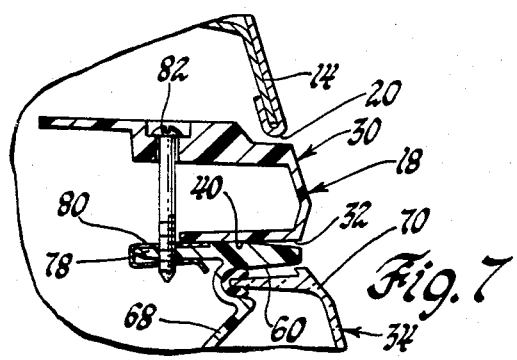
FIG. 7 is an enlarged sectional view taken along line 7—7 of FIG. 1.

The brackets 78 are located adjacent wall 40, FIG. 7, and the nuts 80 receive fasteners 82 between the legs thereof and the legs of the brackets 78 to prevent outboard movement of the housing 34. The fasteners 82 extend through aligned openings in the walls of the upper rail.

In order to remove the lamp assembly 18 for repair or replacement, the fasteners 82 are first removed and then the assembly 28 is shifted outboard of opening 32 or laterally of body 10. This disengages flanges 74 from flanges 52 and 56 and permits the lamp assembly 34 to then be moved rearwardly and outwardly of the opening 32. During this movement, the lead-in flanges 76 engage the outboard edges of the portions of the flange 50 to the left thereof to cam the taillamp assembly 34 slightly rearwardly as it moves outboard. Thereafter the taillamp assembly 34 can be easily removed rewardly and/or outboard of the opening 32.

To mount the taillamp assembly 34 within the finishing panel 30, it is inserted within the opening 32 and the lead-in flanges 76 are located outboard of and adjacent to the lead-in flanges 54 and 58 respective thereto. This locates the retention flanges 74 outboard of and slightly linearly offset from their respective retention flanges 52 and 56. Thereafter the taillamp assembly 34 is moved inboard of the opening. The engagement of the lead-in flanges 76 with their respective lead-in flanges 54 and 58 cams the taillamp assembly 34 slightly forwardly within the opening 32 and moves the retention flanges 74 forwardly of and behind the respective retention flanges 52 and 56 and in face to face engagement therewith as the inboard wall of the taillamp assembly engages the inboard wall of the opening. It can be seen from the foregoing description that insertion and removal of the taillamp assembly 34 is easily accomplished. The fasteners 82 are assembled or disassembled as necessary to retain or release the taillamp assembly 34 within the opening 32.

Figure 6:
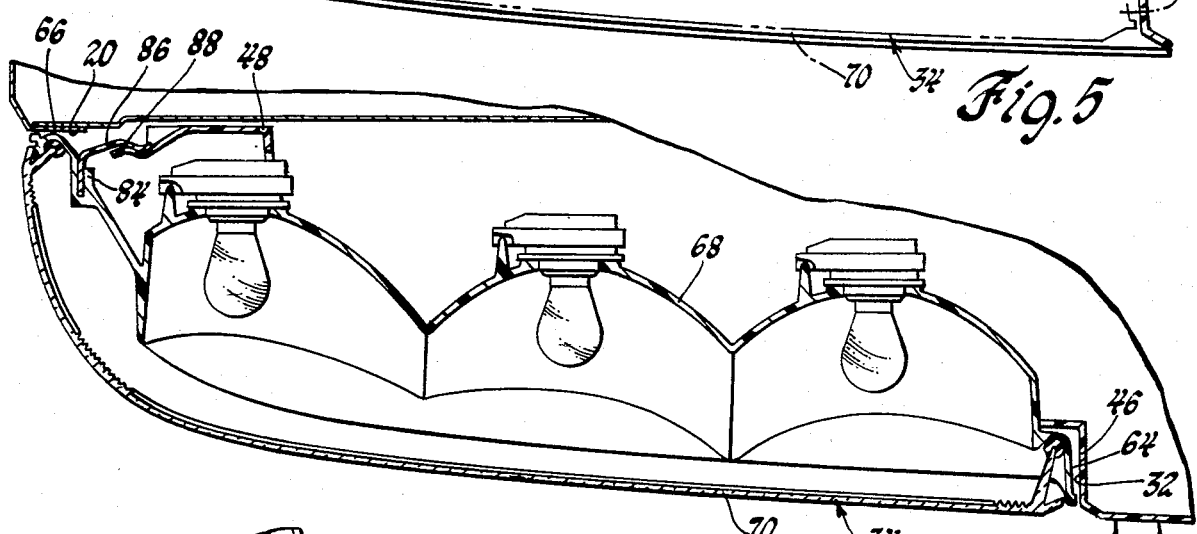
FIG. 6 is an enlarged sectional view taken along line 6—6 of FIG. 1.

As best shown in FIGS. 6 and 8, the forward wall 68 of the taillamp assembly 34 includes a slotted thickened rib 84 which receives the free end of a cantilever type spring clip 86. The free end of this spring clip engages behind the free ends of integral extensions 88 of the forward wall 48 of the finishing panel 30. The engagement and release of the free end of the spring clip 86 with the extensions 88 occurs automatically as the taillamp assembly 34 is inserted inside the opening 32 or removed therefrom.

Although this invention has been shown and described in conjunction with the mounting of a taillamp assembly within a taillamp opening of a vehicle body finishing panel, it should be noted that the invention is equally applicable to the mounting of a head lamp assembly within a head lamp opening of a vehicle body provided by a front end finishing panel such as a grille panel. Further, the lead-in flanges provided on each of the retention flanges aid in moving the retention flanges into and out of engaged face to face relationship. They could be dispensed with if so desired.

Thus this invention provides an improved vehicle body lamp mounting arrangement.

The embodiments of the invention in which an exclusive property or privilege is claimed are defined as follows:

1. The combination comprising, a vehicle body having a taillamp opening defined by spaced upper and lower walls and an inboard side wall, the rear wall and outboard side wall of the opening being open,
   - at least one linear retention flange on each upper and lower wall extending toward the open outboard side wall of the opening,
   - a taillamp assembly having spaced upper and lower walls and an inboard side wall, each said wall being respective to a like wall of the opening, and also having an outboard side wall,
   - at least one linear retention flange on each upper and lower wall of the assembly extending toward the outboard side wall thereof, each said retention flange being respective to a taillamp opening retention flange,
   - the taillamp assembly being initially located within the opening with said retention flanges of the assembly positioned in linearly offset relationship to said respective retention flanges of the taillamp opening, subsequent movement of the taillamp assembly inboard of the opening moving said taillamp assembly flanges behind said respective taillamp opening flanges and into engaged face to face relationship therewith to retain the taillamp assembly within the taillamp opening against movement rearwardly and outwardly thereof, the upper and lower walls and inner wall of the taillamp assembly being juxtaposed to like walls of the taillamp opening and the outboard side wall of the taillamp assembly closing the open outboard side of the opening, and means releasably securing the taillamp assembly to the vehicle body to retain the assembly within the opening against movement relative thereto.

2. The combination comprising, a vehicle body having a taillamp opening defined by spaced upper and lower walls and an inboard side wall, the rear wall and outboard side wall of the opening being open,
- at least one linear retention flange on each upper and lower wall extending toward the open outboard side wall of the opening, each retention flange having an angular lead-in flange,
- a taillamp assembly having spaced upper and lower walls and an inboard side wall, each said wall being respective to a like wall of the opening, and also having an outboard side wall,
- at least one linear retention flange on each upper and lower wall of the assembly extending toward the outboard side wall thereof, each said retention flange being respective to a taillamp opening retention flange, each taillamp assembly retention flange having an angular lead-in flange respective to a like flange of the taillamp opening,
- the taillamp assembly being initially located within the taillamp opening with said respective lead-in flanges in juxtaposed relationship and said respective retention flanges positioned in linearly offset relationship, subsequent movement of the taillamp assembly inboard of the opening engaging said lead-in flanges to cam said taillamp assembly forwardly within said opening and move said taillamp assembly retention flanges behind said respective taillamp opening retention flanges and in engaged face to face relationship therewith to retain the taillamp assembly within the taillamp opening against movement rearwardly and outwardly thereof, the upper and lower walls and inner wall of the taillamp assembly being juxtaposed to like walls of the taillamp opening and the outboard side wall of the taillamp assembly closing the open outboard side of the opening, and
- means releasably securing the taillamp assembly to the vehicle body to retain the assembly within the opening against movement relative thereto.

3. The combination comprising, a vehicle body finishing panel having spaced upper and generally planar juxtaposed lower walls and a generally planar inboard side wall,
- at least one linear retention flange extending laterally to each upper and lower wall at the forward edge thereof,
- a lead-in flange extending angularly to each linear flange at the outboard terminus thereof,
- a lamp housing having spaced upper and lower walls and an inboard side wall, each respective to a like wall of the opening and an outboard side wall,
- at least one linear retention flange on each upper and lower wall of the housing extending toward the outboard side wall of the housing and respective to each finishing panel flange, a lead-in flange extending angularly to each such linear housing flange at the inboard terminus thereof and respective to a finishing panel flange,
- the taillamp assembly being moved inboard of the taillamp opening to engage the lead-in flanges of the lamp housing with the respective finishing panel lead-in flanges and guide the respective linear retention flanges into engaged face to face relationship and retain the lamp housing within the lamp opening against movement in a direction outboard thereof, the upper and lower walls and inner wall of the housing being juxtaposed to like walls of the lamp opening and the outboard side wall of the housing closing the open outboard side of the opening, and
- means releasably securing the lamp housing to the finishing panel to retain the lamp housing within the opening against movement outboard of the lamp opening.

* * * * *